United States Patent [19]
Taylor et al.

[11] 3,972,799
[45] Aug. 3, 1976

[54] APPARATUS FOR REMOVING SOLIDS FROM DRILLING MUD

[76] Inventors: Julian S. Taylor, 8300 SW. 8, Oklahama City, Okla. 73108; Dwight C. Birdsong, 7105 Woodridge Ave., Oklahoma City, Okla. 73132

[22] Filed: May 27, 1975

[21] Appl. No.: 581,080

[52] U.S. Cl. .......................... 204/300 R; 204/180 R
[51] Int. Cl.² ...................... B01D 13/02; C25B 9/00
[58] Field of Search .......................... 204/180 R, 300

[56] References Cited
UNITED STATES PATENTS

| | | | |
|---|---|---|---|
| 2,219,312 | 10/1940 | Hayward et al. | 204/180 R |
| 3,236,757 | 2/1966 | Litt | 204/300 X |
| 3,642,605 | 2/1972 | Chenel et al. | 204/300 |

*Primary Examiner*—John H. Mack
*Assistant Examiner*—A. C. Prescott
*Attorney, Agent, or Firm*—Robert K. Rhea

[57] ABSTRACT

A generally horizontal container, interposed in a drilling mud conductor, forms an enlarged area passageway for the drilling mud. The container transversely journals a plurality of spaced rotating plate-like discs forming positive electrodes between negative electrodes formed by a plurality of spaced-apart interconnected panels with a peripheral portion of each disc immersed in the drilling mud. Solids in suspension are attracted by and deposited as a layer or film on opposing surfaces of the respective discs. A stationary scraper blade element, adjacent the discs, removes the deposited solids. Pressure operated plungers, disposed on opposing sides of the respective disc, periodically move the collected solids toward a discharge end portion of the scraper blade element for removal.

1 Claim, 7 Drawing Figures

APPARATUS FOR REMOVING SOLIDS FROM DRILLING MUD

BACKGROUND OF THE INVENTION

1. Field of the Invention.

The present invention relates to treating drilling mud and more particularly to an apparatus and method for removing solids from drilling mud.

In rotary well drilling it has been common practice to supplement ordinary muds by drilling mud additives. These additives are in a fine state of subdivision and include colloidal material and mud weighting material for enhancing the suspension of drilled solids in the mud as well as increasing the weight per unit of measure of mud. The drilling mud additives form a desirable thin filter cake or seal on the borehole wall. Drilled native solids in drilling mud are progressively subdivided until they reach a comminuted state. A concentration of such finely divided native solids in the mud results in an undesirable substantial increase in the mud viscosity tending to form a gel. In prior years excess drilling mud, containing a concentration of drilled solids, was deposited in a reservoir pit, adjacent the well site.

Drilling mud additives are relatively expensive and the mud mixture may be continuously reused if excess solids are removed. For ecology and economic reasons the reserve pit disposal of drilling muds has been discontinued. Furthermore, space requirements of off shore drilling rig platforms does not permit the use of reserve pits.

In off shore drilling operations it has been the practice to transport the drilling mud, containing a concentration of drilled solids, to the shore for disposal. The disposal of such drilling mud presents a problem for the reason the colloidal material in the muds delays evaporation of the contained water and thus a compacting of the solids. Drilling mud additives and water contained in the mud removed from off shore drilling locations for disposal must be replaced by fresh water and additives from shore.

This invention overcomes the above problems by providing an apparatus and method for removal of excess drilled solids from a drilling mud stream.

2. Description of the Prior Art

The prior art generally discloses apparatus for removing drilling mud solids which, in addition to conventional apparatus for removing relatively large drill cuttings, such as a shale shaker, generally comprise a series of tanks or receptacles forming a passageway for the mud in which the flow rate is reduced in each successive tank for permitting a settling action of the solids. The only similarity between this invention and such prior apparatus is that the mud flow rate is reduced to a rate below its normal rate of flow through a conduit, or the like, but this invention does not rely on a settling of the solids. The solids being removed by an electrolytic action.

SUMMARY OF THE INVENTION

A box-like frame forming a container defines an enlarged area in a drilling mud passageway and is preferably mounted on a mobile platform adapted to be positioned near a drilling mud source. A prime mover on the mobile platform operates a generator providing a source of electrical energy which drives a motor operating a pump connected by conduits with the source of drilling mud and the container frame. The container is provided with an exhaust port to return treated drilling mud to the drilling mud suction pit. The container supports a plurality of plates or discs arranged in parallel relation on an axle extending transversely of the direction of mud flow through the container frame with a peripheral portion of each disc immersed in the mud and the discs being rotated at a predetermined angular rate of rotation by a motor, or the like. A plurality of panels are interconnected in spaced-apart relation between the respective discs parallel to the direction of mud flow. The positive potential of a direct current source is connected with the discs and its negative terminal is connected with the panels. This forms an electrolytic action with the drilling mud serving as the electrolyte between the electrodes formed by the discs and panels. The positive potential of the discs attracts native solids, such as clay etc., in the drilling mud which are deposited as a film or layer on the respective surfaces of each disc.

A plate-like stationary box frame supported scraper blade element is arranged with its plane normal to and in close spaced relation with opposing side surfaces of the discs for removing the layers of solids from the discs as they rotate about their axis. Fluid pressure operated cylinders, mounted on the mobile platform, move ejection plungers toward an ejection end of the scraper blade element to move solids collected by the scraper blade element away from the discs. A motor driven ventilating fan, communicating with the container frame vents gas released by the electrolytic action.

The principal objects are to provide a method and apparatus for removing solids from a portion of the drilling mud at a well drilling site wherein the solids recovered are substantially dehydrated for ease of disposal and compacting and permitting uninterrupted use of the drilling apparatus.

DESCRIPTION OF THE PREFERRED EMBODIMENT

Figure 1:
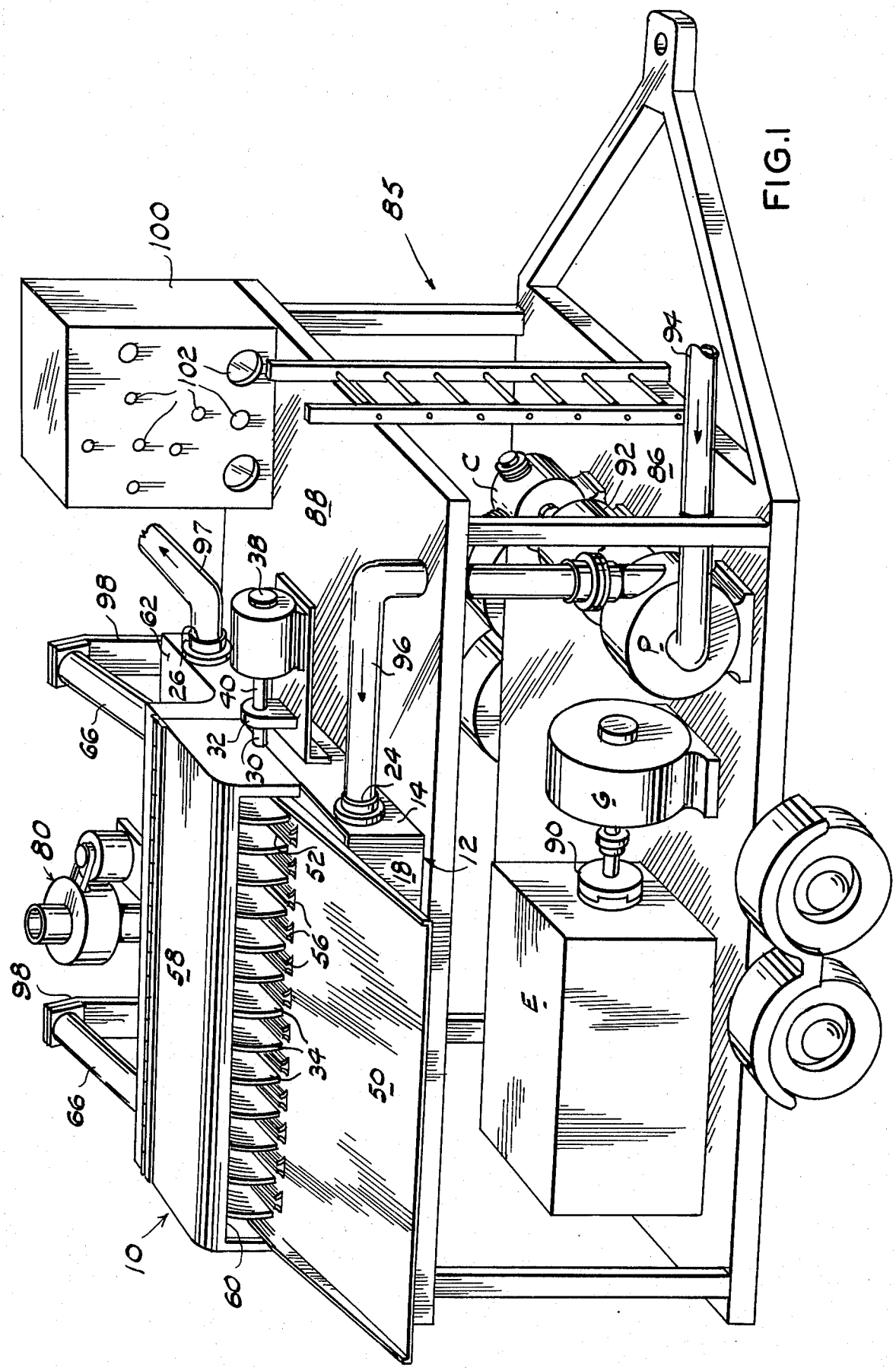
FIG. 1 is a perspective view of the apparatus mounted on a mobile platform.
Figure 2:
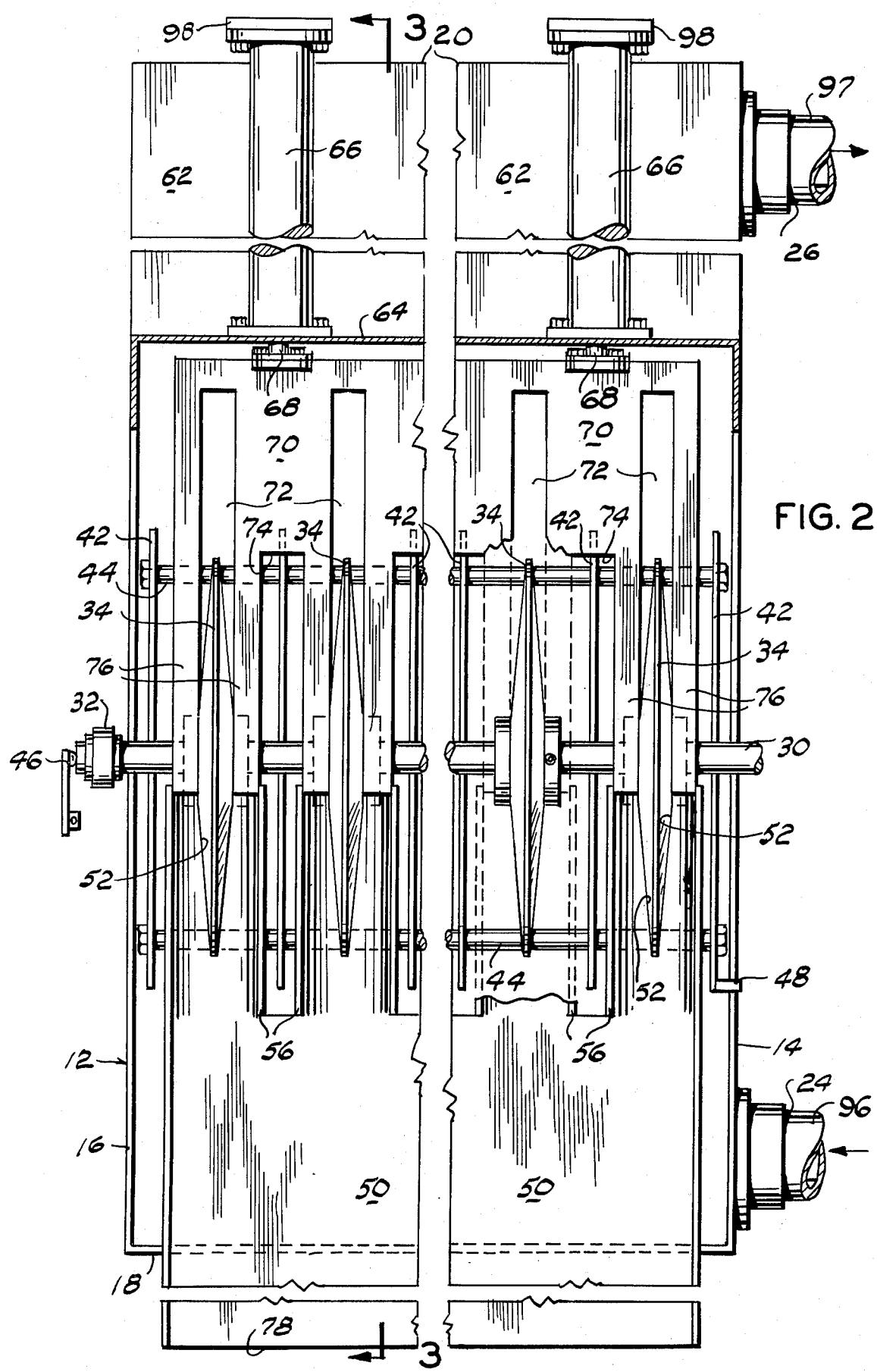
FIG. 2 is a fragmentary top view, partially in section, taken substantially along the line 2—2 of FIG. 3.

Like characters of reference designate like parts in those figures of the drawings in which they occur.

In the drawings:

The reference numeral 10 indicates the apparatus which, in the example shown, is substantially rectangular in general configuration. The apparatus includes a box-like frame 12, preferably formed of electrical nonconductive material, having opposing side walls 14–16, a front wall 18 and a rearward wall 20 secured to the marginal edges of a bottom 22. The box frame 12 is provided with an inlet port 24 and an outlet port 26 for connection with a drilling mud conduit in the manner hereinafter explained.

The box frame 12 thus forms a chamber or container and a passageway for drilling mud 28 wherein the velocity of the drilling mud decreases, in its passage through the box frame 12, to a flow rate substantially below the normal flow rate in the conduit supplying the mud to the container as explained herein below, thus permitting the electrolytic action as presently explained.

Figure 3:
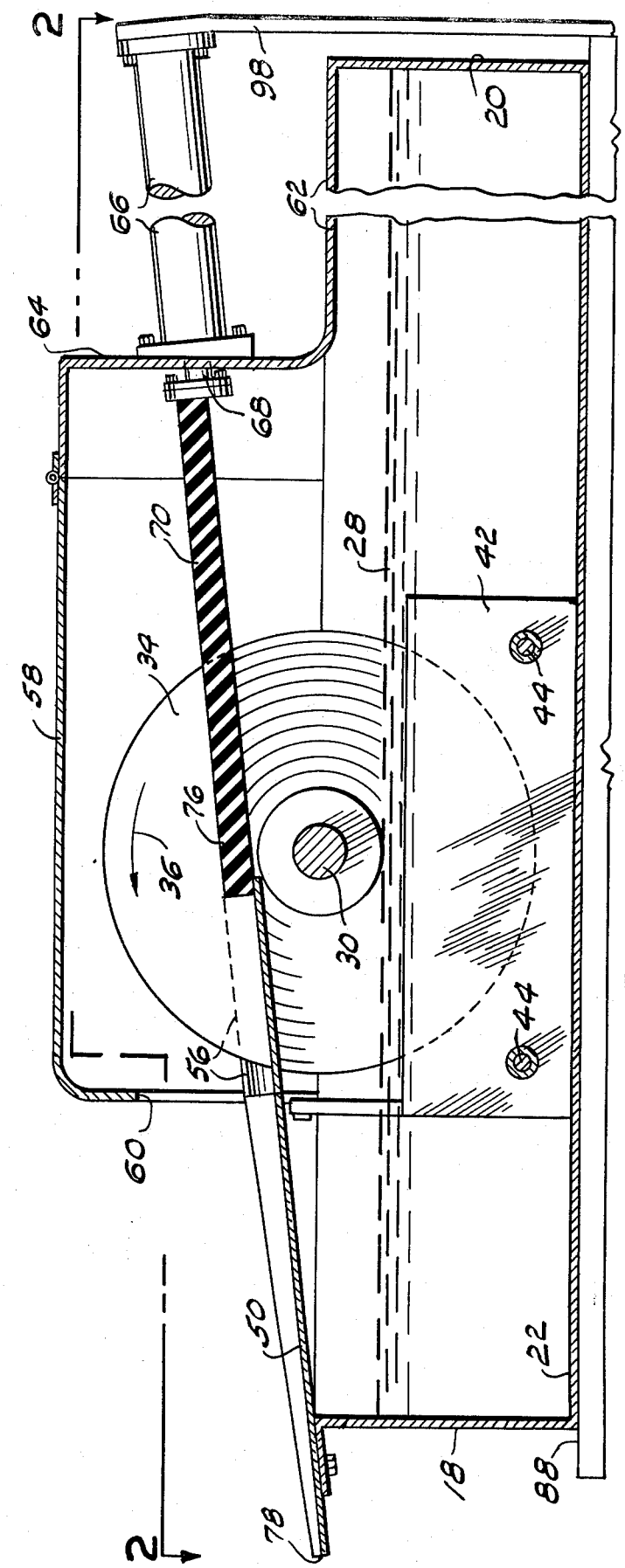
FIG. 3 is a fragmentary vertical cross sectional view taken substantially along the line 3—3 of FIG. 2.
Figure 6:
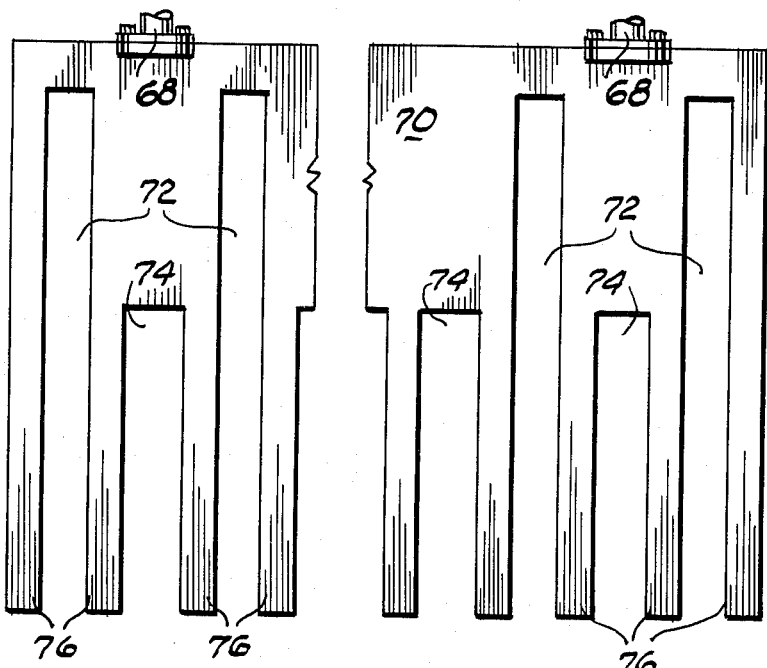
FIG. 6 is a fragmentary top view of the solids ejection plunger.
Figure 7:
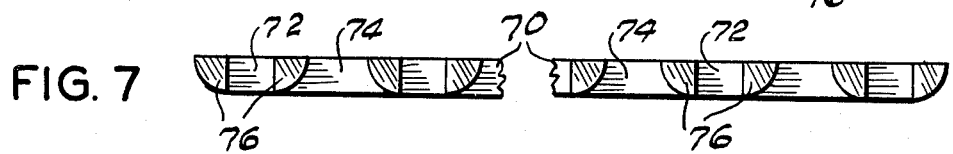
FIG. 7 is a bottom end view of FIG. 6.
Figure 5:
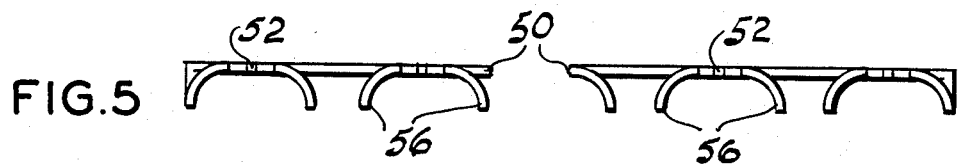
FIG. 5 is a top end view of FIG. 4.
Figure 4:
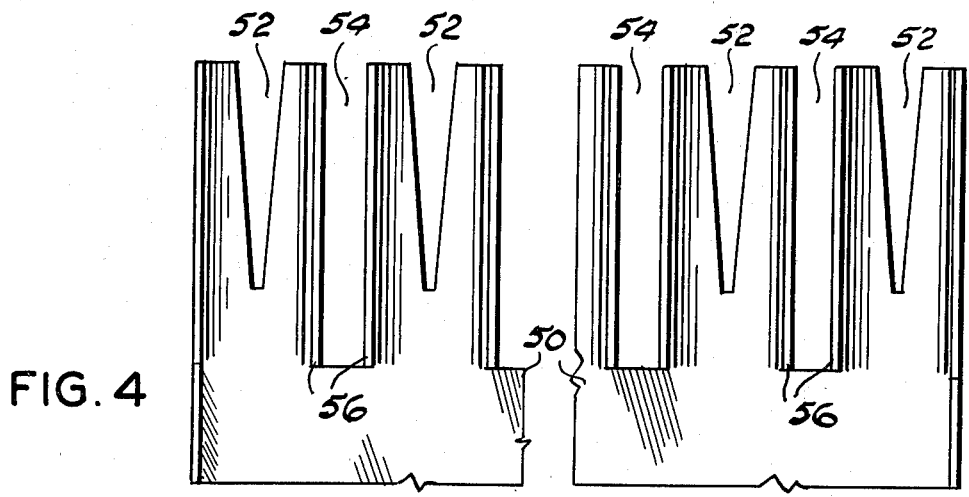
FIG. 4 is a fragmentary top view of the scraper blade element.

A shaft or axle 30 extends transversely of the box frame 12 at the upper limit of its side walls and intermediate its ends and is journalled by bearings 32. A plurality of plate-like discs 34 are axially secured to the axle in spaced-apart longitudinal relation. The discs are preferably characterized by an axially thickened hub portion defining opposing side surfaces converging toward its periphery. The relationship between the diameter of the discs 34 and the vertical height of the box frame side walls 14 and 16 is selected so that a major portion of the depending peripheral portion of each disc is immersed in the drilling mud 28. The discs 34 are rotated in the direction of the arrow 36 (FIG. 3) by a motor 38 having its drive shaft 40 connected with the axle 30 and electrically insulated therefrom or supported on a platform connected with one of the box frame side walls for the purposes readily apparent.

A plurality of vertical panels 42 are interconnected in spaced-apart parallel relation by a pair of rods 44 extending transversely of the frame with the panels respectively disposed between the discs and outwardly of the endmost disc at the respective ends of the axle 30.

A source of direct current has its positive terminal connected with a contact 46 in axial electrical contact with the axle 30 so that the axle and discs 34 may rotate independently of the contact and form positive electrodes. The negative terminal of the current source is connected with a lug 48 secured to one of the panels 42 so that the panels 42 form negative electrodes. The drilling mud 28 forms an electrolyte and conducts current. The atoms in the native solids of the drilling mud gain electrons and thus have a negative charge and are attracted to the surface of the positive charged electrode discs 34 immersed in the drilling mud. This results in a film or layer of both the native solids and drilling mud additives being deposited on opposing surfaces of the discs 34. The term "native solids" as used herein is intended to include earth formations drilled through when forming a borehole. The term "drilling mud additives" refers to colloidal material conventionally added to drilling mud to obtain a desired viscosity and mud weight. The atoms of the comminuted native solids attain a greater negative charge than the atoms of the drilling mud additives resulting in a greater proportion of native solids than drilling mud additives being deposited on the positive electrodes 34.

A plate-like scraper blade element 50, preferably formed of electrical nonconductive material, overlies and is preferably supported, in downwardly inclined relation from the axial portion of the discs 34, by the forward end portion of the box frame 12. The scraper blade element is provided with a plurality, one for each disc 34, of substantially V-shaped notches 52 dimensioned for radial contiguous contact with opposing surfaces of the respective disc so that as the discs are rotated by the motor 38 the film or layer of solids on the discs are collected by the upper surface of the scraper blade 50. Between respective pairs of the discs, the scraper blade 50 is slotted or split, as at 54, parallel with the planes of the discs with the material of the scraper blade arcuately turned upwardly to form a trough-like configuration, in transverse section, extending longitudinally of the respective V-shaped slot 52 for collecting the solids scraped off of the blades. The respective lateral edge portions of the scraper blade adjacent the box frame side walls are similarly curved arcuately upward to complete the trough configuration for the endmost disc on the axle 30.

The discs 34 and major portion of the box-like frame 12 are covered by a hingedly connected electrical nonconductive material cover or lid 58 having an aperture 60 in its front wall accommodating the scraper blade trough portions for the purpose of permitting removal of the solids away from the discs 34. A box frame top wall 62 overlies the rearward end portion of the box frame and has a portion thereof turned vertically upward intermediate the length of the box frame to form a transverse support 64.

A pair of fluid pressure operated cylinders 66 are connected with the support wall 64 in parallel spaced relation and each include a piston rod 68 connected with a resilient material, such as hard rubber, plate-like ejection member 70. The ejection member 70 extends transversely of the box frame coextensive with the lateral edges of the scraper blade 50 and longitudinally of the box frame between the support wall 64 and axis of the axle 30. The member 70 is longitudinally slotted, as at 72 and 74, with the slots 72 admitting the respective disc 34 and the slots 74 spanning the spacing between the edge walls forming the arcuate walls of the scraper blade trough thus defining a plurality of plunger fingers 76, two for each trough, and cross sectionally conforming to the arcuate surface thereof. The purpose of the plunger fingers 76 is to move solids collected by the scraper blade toward the ejection end 78 of the scraper blade which projects outwardly beyond the box frame front wall 18 for disposal. The pressure cylinders are operated at predetermined intervals to move the solids away from the discs 34.

Gases, such as hydrogen, released by the electrolytic action, are conveyed away from the apparatus 10 by a motor driven exhaust fan 80 connected with the box frame support wall 64 and communicating with the box frame area inwardly of the lid 58.

The apparatus 10 is preferably disposed on a horizontal surface adjacent a well drilling site and, by way of example, may be mounted on a trailer-like device 85 having a wheel supported base platform 86 and an elevated or top platform 88. A prime mover, such as a gasoline engine E, is mounted on the base 86 and is drivably connected with a direct current generator G by a clutch 90. The generator G thus provides the source of direct current for operating the disc driving motor 38 and for charging the discs 34 and panels 42, as explained hereinabove, and for other purposes as presently apparent.

A pump P, driven by a motor 92, both mounted on the base platform 86, has its intake connected with a source of drilling mud by an inlet or suction conduit 94 with its outlet conduit 96 connected with the box frame inlet port 24. A return line 97 connected with the box frame outlet port 26 returns the drilling mud to the suction pit. A compressor C, also driven by the motor 92, supplies fluid pressure for the pressure cylinders 66. The ends of the pressure cylinders 66, opposite the box frame support 64, are supported by standards 98 in turn connected with the top platform 88.

A control panel 100, mounted on the mobile platform 85, contains suitable controls 102 and gauges or meters for operating the apparatus 100 and supporting components.

Obviously the invention is susceptible to changes or alterations without defeating its practicability. Therefore, I do not wish to be confined to the preferred embodiment shown in the drawings and described herein.

I claim:

1. An apparatus for separating solids from drilling mud, comprising:

frame means including a container forming a passageway for drilling mud;

an axle horizontally journalled by said frame transversely of the direction of mud flow through the passageway;

positive electrode means including a disc having a thickened hub portion coaxially secured to said axle, the opposing side surfaces of said disc converging toward its periphery;

motor means for rotating said axle about its longitudinal axis, the depending peripheral portion of said disc remaining immersed in the mud as the disc is rotated about its axis;

negative electrode means including a panel disposed parallel with said disc and at least partially immersed in the drilling mud;

a source of direct current connected with and flowing between said positive and negative electrode means whereby, said drilling mud forms an electrolyte and said solids tend to develope a negative charge and are attracted to and deposited as a film on the surfaces of said disc;

scraper means comprising a planar member overlying a portion of said frame means and extending downwardly and laterally from said axle and having a V-shaped slot in its end portion adjacent said axle cooperatively receiving, in radial contiguous contacting relation, opposing side surfaces of said disc for removing the film of solids from the disc surfaces;

plunger means comprising a plate-like member overlying said frame means opposite said scraper member, said plunger member having an end portion overlying the end portion of said scraper member adjacent said axle and having a rectangular slot cooperatively receiving opposing side surfaces of the hub portion of said disc, said plunger member being reciprocable along the upper surface of said scraper member toward the downwardly disposed end of said scraper member for moving solids collected by said scraper member away from said disc; and, means including a pressure operated cylinder connected with said plunger member for periodically reciprocating said plunger member.

* * * * *